United States Patent
Hu et al.

(10) Patent No.: US 11,480,139 B1
(45) Date of Patent: Oct. 25, 2022

(54) EXHAUST GAS RECOVERY SYSTEM WITH HIGH-PRESSURE MIXER

(71) Applicant: FORD GLOBAL TECHNOLOGIES, LLC, Dearborn, MI (US)

(72) Inventors: Liangjun Hu, Bloomfield Hills, MI (US); Eric Matthew Kurtz, Dearborn, MI (US); Daniel Joseph Styles, Canton, MI (US); Darrell Sparks, Howell, MI (US); Daniel William Kantrow, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/474,590

(22) Filed: Sep. 14, 2021

(51) Int. Cl.
  *F02M 26/19* (2016.01)
  *F02M 26/05* (2016.01)
(52) U.S. Cl.
  CPC ............ *F02M 26/19* (2016.02); *F02M 26/05* (2016.02)
(58) Field of Classification Search
  CPC .............................. F02M 26/19; F02M 26/05
  See application file for complete search history.

(56) References Cited

U.S. PATENT DOCUMENTS

| | | | |
|---|---|---|---|
| 8,056,340 B2* | 11/2011 | Vaught | F02M 26/19 60/611 |
| 10,012,184 B2* | 7/2018 | Guidi | F02M 26/06 |
| 2009/0165757 A1* | 7/2009 | Matthews | F02M 26/19 123/568.17 |
| 2010/0065028 A1* | 3/2010 | Styles | F02M 26/19 123/306 |

FOREIGN PATENT DOCUMENTS

| | | |
|---|---|---|
| CN | 109083771 A | 12/2018 |
| CN | 210135015 U | 3/2020 |
| CN | 213392430 U | 6/2021 |

\* cited by examiner

*Primary Examiner* — Xiao En Mo
(74) *Attorney, Agent, or Firm* — Vincent Mastrogiacomo; Brooks Kushman P.C.

(57) ABSTRACT

An engine system includes an engine having an intake manifold, a turbocharger having a compressor, and an exhaust gas recovery (EGR) mixer coupled between the compressor and the intake manifold. The EGR mixer includes a central air duct having a central axis, an annular ring circumscribing the central duct and having an inlet connectable to an EGR system and an outlet in fluid communication with the central air duct, and a vane assembly disposed in the central air duct upstream of the annular ring and having a plurality of vanes configured to swirl air passing therethrough.

20 Claims, 3 Drawing Sheets

EXHAUST GAS RECOVERY SYSTEM WITH HIGH-PRESSURE MIXER

TECHNICAL FIELD

This application relates to exhaust-gas recirculation (EGR) in motor-vehicle engine systems and more particularly to high-pressure EGR mixers.

BACKGROUND

A boosted internal-combustion engine may exhibit higher combustion and exhaust temperatures than a naturally aspirated engine of equivalent output power. Such higher temperatures may increase nitrogen-oxide (NOx) emissions. Exhaust-gas recirculation (EGR) is one approach for reducing NOx emissions. EGR strategies reduce the oxygen content of the intake-air charge by diluting it with exhaust. When the diluted air-exhaust mixture is used in place of fresh air to support combustion in the engine, lower combustion and exhaust temperatures result.

SUMMARY

According to one embodiment, an engine system includes an engine having an intake manifold, a turbocharger having a compressor, and an exhaust gas recovery (EGR) mixer coupled between the compressor and the intake manifold. The EGR mixer includes a central air duct having a central axis, an annular ring circumscribing the central duct and having an inlet connectable to an EGR system and an outlet in fluid communication with the central air duct, and a vane assembly disposed in the central air duct upstream of the annular ring and having a plurality of vanes configured to swirl air passing therethrough.

According to another embodiment, an engine system includes an engine having an intake manifold, a turbocharger having a compressor, and an exhaust gas recovery (EGR) mixer coupled between the compressor and the intake manifold and configured to mix fresh air from the compressor with recovered exhaust gases from an EGR system. The EGR mixer has an air duct defining an EGR port and a variable-pitch vane assembly in fluid communication with the air duct and disposed upstream of the EGR port. The vane assembly includes a plurality of vanes circumferentially arranged around a central axis of the air duct and movable between various pitches to increase and decrease an effective cross-sectional area of the air duct and modify a swirl of the air passing therethrough.

According to yet another embodiment, an exhaust gas recovery (EGR) mixer includes a central duct having an upstream side connectable to a compressor and a downstream side connectable to an engine intake manifold. An annular ring circumscribing the central duct and has an inlet port connectable to an EGR system, a volute extending from to the inlet port to a terminal end, and an aperture defined in an inner side wall of the volute to connect the volute and the central duct in fluid communication.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A boosted engine system, e.g., turbocharged, may include a high-pressure EGR loop that recirculates exhaust gases to the engine intake. Some vehicles may also include a low-pressure EGR loop. In the high-pressure EGR loop, the exhaust is drawn from upstream of the turbine and is mixed with intake air downstream of the compressor. In the low-pressure EGR loop (if present) the exhaust is drawn from downstream of the turbine and is mixed with intake air upstream of the compressor.

To enable appropriate control of EGR dilution levels and protect combustion stability, the recirculated exhaust is homogenized with the intake-air charge, for example, via an EGR mixer. However, some EGR mixers suffer a trade-off between effective homogenization on the one hand and excessive air-flow restriction on the other. In other words, the flow elements that provide effective homogenization also cause drag in the intake air flow, which reduces overall efficiency. Conversely, EGR mixers that present minimal drag may not provide adequate homogenization at every mixing point and operating condition.

Figure 1:
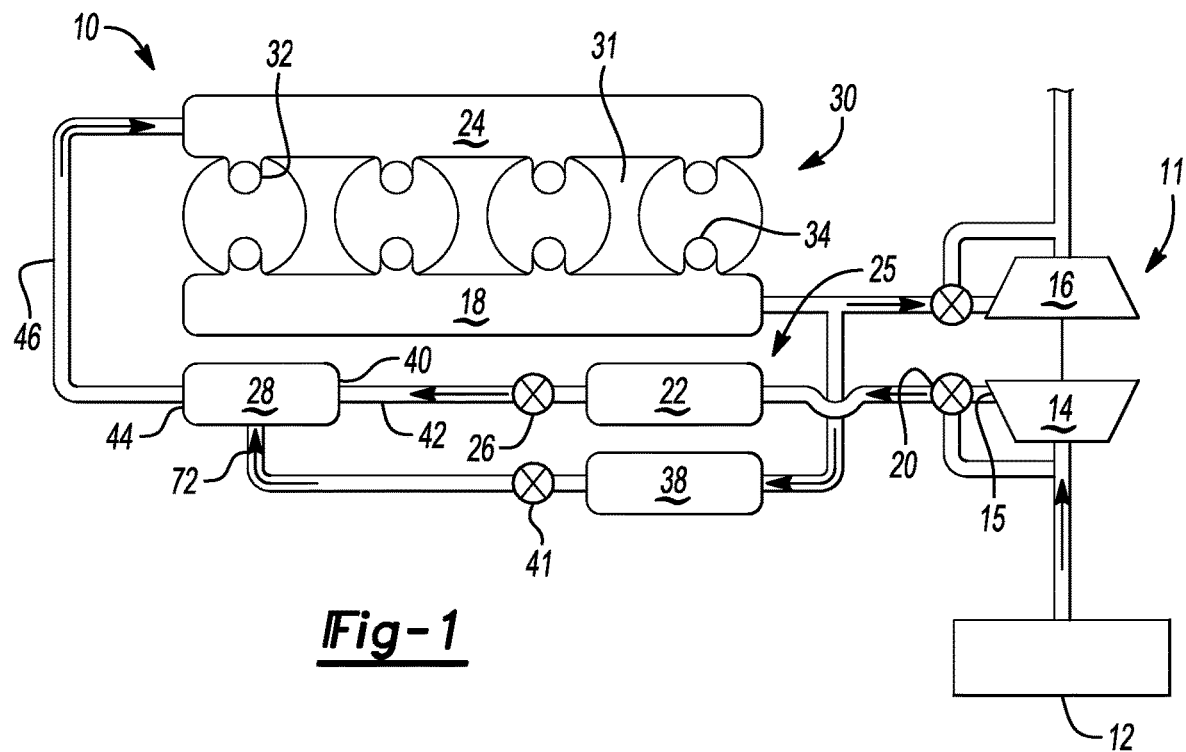
FIG. 1 is a schematic diagram of an engine system having a turbocharger and an EGR with a high-pressure mixer.

Referring to FIG. 1, an example internal-combustion engine system 10 is powered by fuel, such as diesel or gasoline. The engine system 10 includes a turbocharger 11 having a compressor 14 and a turbine 16. An air cleaner 12 inducts fresh air from the ambient and supplies filtered, fresh air to the compressor 14. The compressor 14 may be any suitable intake-air compressor. In the illustrated embodiment, the compressor is a turbocharger compressor mechanically coupled to the turbine 16 but may be a supercharger in other embodiments. The turbine 16 is driven by expanding engine exhaust from an exhaust manifold 18. A blow-off valve 20 is coupled across the compressor 14 from outlet to inlet.

In the engine system 10, the outlet 15 of compressor 14 is coupled to a charge-air cooler 22 (e.g., an intercooler). In one embodiment, the charge-air cooler 22 is a gas-to-liquid heat exchanger configured to cool the compressed-air charge to temperatures suitable for admittance into the intake manifold 24. In another embodiment, the charge-air cooler may be an air-to-air heat exchanger.

The intake manifold 24 and the exhaust manifold 18 are coupled to a series of combustion chambers 30 of the engine 31 through a series of intake valves 32 and exhaust valves 34, respectively. The engine may include compression ignition and/or spark ignition.

An EGR system 25 is configured to recirculate exhaust gases to the intake manifold. The system 25 include may include a cooler 38 coupled downstream of the exhaust manifold 18 and upstream of the turbine 16. The EGR cooler 38 may be a gas-to-liquid heat exchanger configured to cool the exhaust to temperatures suitable for mixing into the compressed-air charge. From the cooler 38, high-pressure exhaust flows to a high-pressure EGR mixer 28. A valve 41 for controlling the EGR flow rate may be located either upstream or downstream of the EGR cooler 38. In some embodiment, a cooler by-pass line and valve may be included to provide a parallel EGR loop that does not exchange heat with the coolant. The by-pass line may be used to flow substantially uncooled high-pressure exhaust to the intake manifold. As will be further described below, the EGR mixer 28 mixes the metered exhaust into the intake-air charge. From the outlet of the EGR mixer 28, the diluted air charge flows to the intake manifold 24. The EGR mixer 28 includes an inlet side 40 that is connected to the outlet 15 of the compressor 14 via one or more air ducts 42 and the cooler 22. The EGR mixer 28 also includes an outlet side 44 that is connected to the intake manifold 24 via one or more ducts 46.

A throttle valve may be provided between the cooler 22 and the mixer 28. The throttle valve is controllable to control the amount of air entering the engine. Alternatively, the EGR mixer 28 may be disposed downstream of the compressor outlet 15 and upstream of the throttle valve 26.

Figure 2:
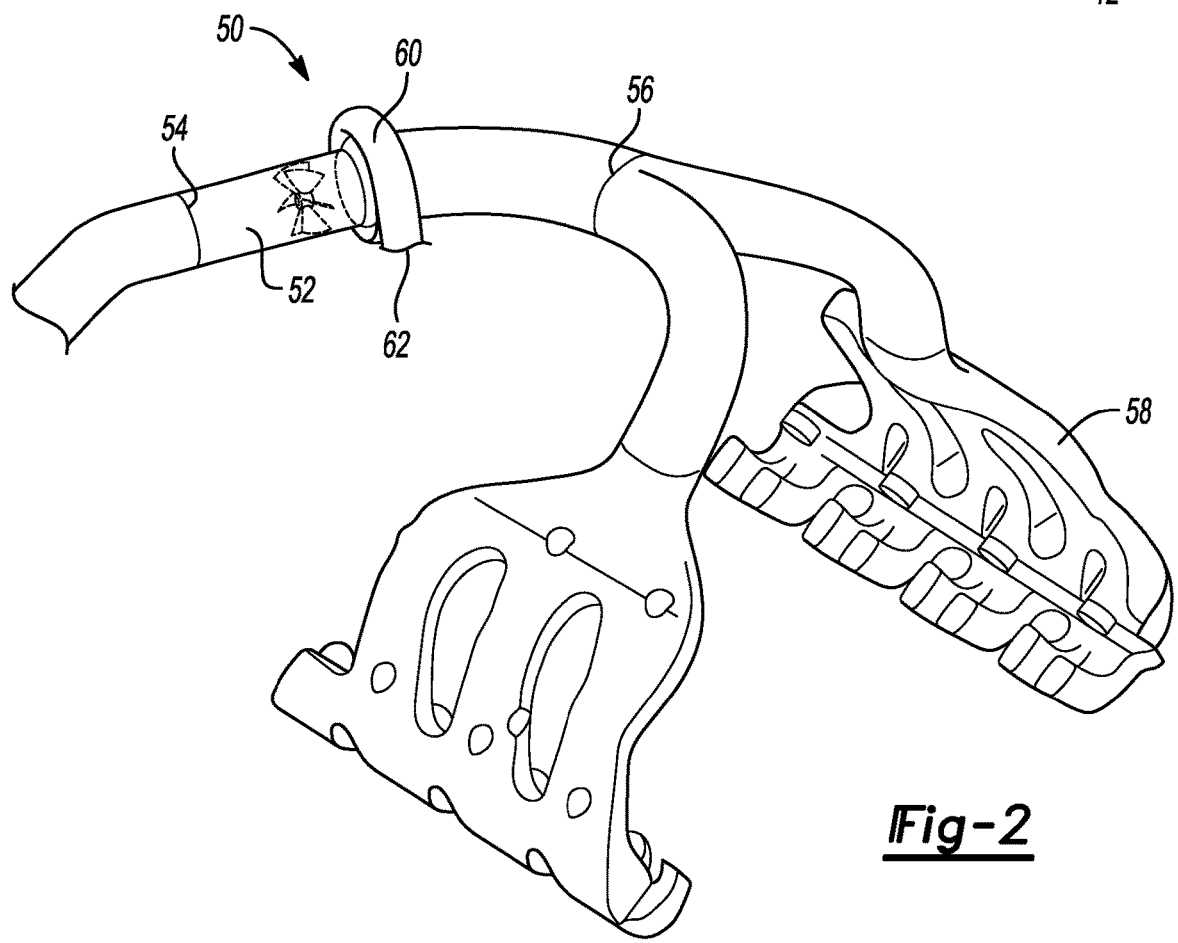
FIG. 2 is a schematic diagram of an air intake system including a high-pressure EGR mixer.
Figure 3:
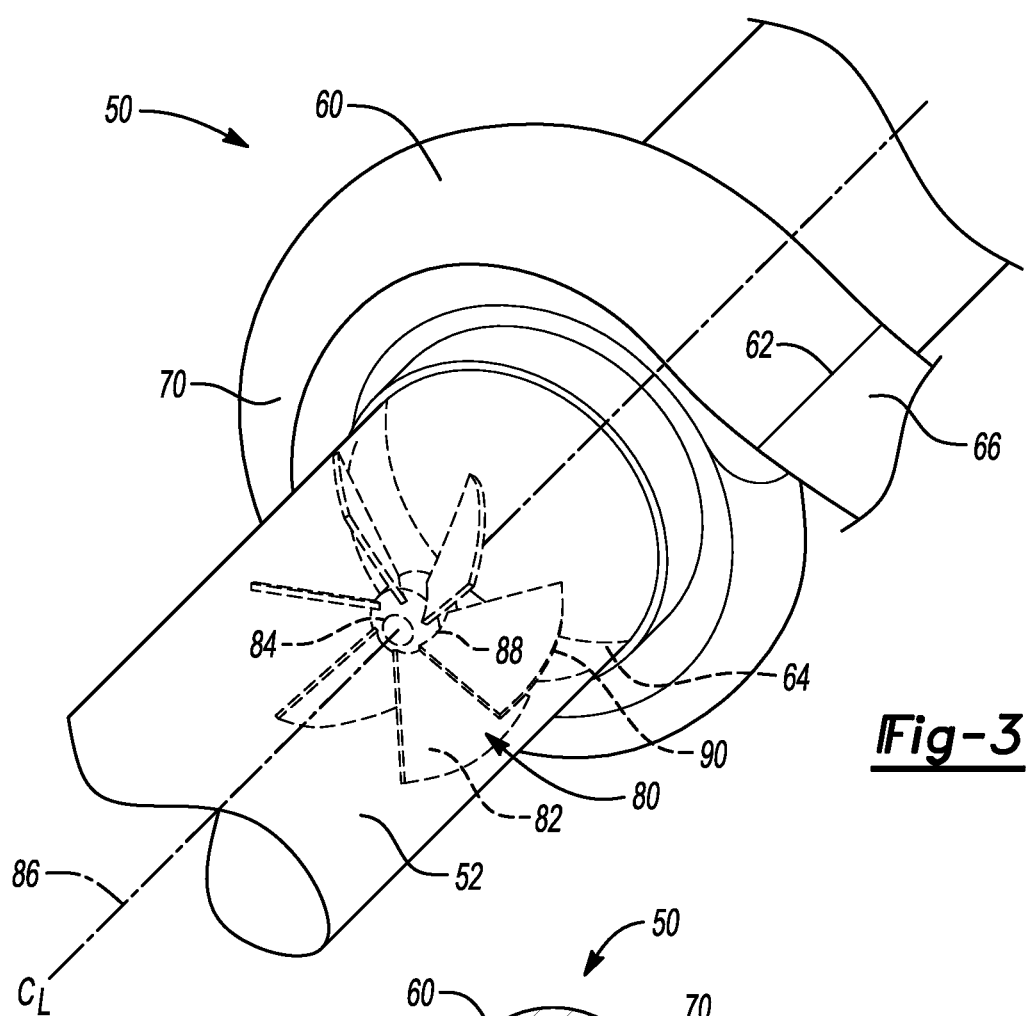
FIG. 3 is a perspective view of a high-pressure EGR mixer according to one or more embodiments.

Referring to FIGS. 2 and 3, a high-pressure EGR mixer 50, according to one or more example embodiments, includes a central air duct 52 having an inlet 54 connectable to the compressor via one or more intermediary components (such as air ducts, coolers, valves and the like) and an outlet 56 connected to one or more intake manifolds 58 via one or more intermediary components (such as air ducts, throttle valve, or the like). An annular ring 60 encircles the central air duct 52 and has an inlet 62 connectable to the EGR system, such as via conduit 66, and an outlet 64 opening into the central duct 52. While the central duct 52 is illustrated as a single component, it may be formed of multiple components joined together.

Figure 4:
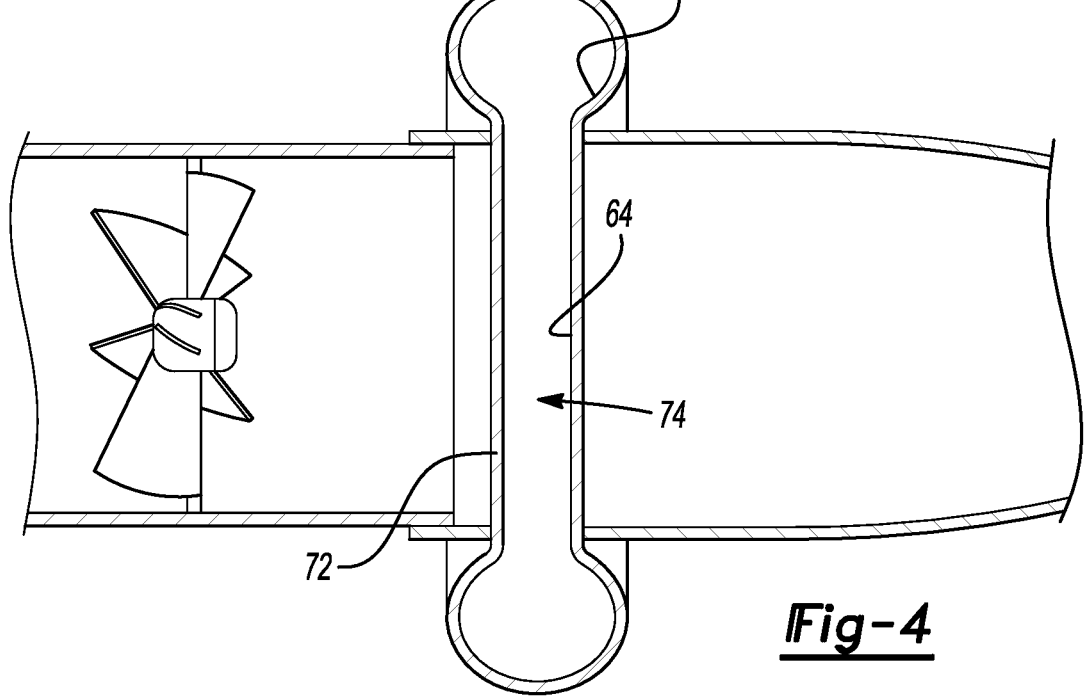
FIG. 4 is a cross-sectional side view of the high-pressure EGR mixer of FIG. 3.

The annular ring 60 includes a spiral-shaped volute 70 having a starting end at the inlet port 62 and extending circumferentially around the annular ring 60 to a terminal end. The cross-sectional area of the volute 70 decreases from the starting end to the terminal end. The volute 70 is configured to create a swirl in the EGR gases (a counter-clockwise swirl in the illustrated embodiment) to mix the exhaust gases with the compressed fresh-air charge. Mixing the exhaust gases with the high-pressure air charge is challenging and the swirl created by the volute 70 may substantially increases the homogeneity of the air charge exiting the mixer 50. The volute 70 defines one or more apertures in an inner wall 72 to release the exhaust gases into the central duct 52. As best shown in FIG. 4, the aperture may be a circumferential slot 74 that extends along at least a portion of the volute 70. In some embodiments, the slot 74 may only extend along a portion of the volute 70, and, in other embodiments, the slots 74 may be continuous along the length of the volute. Alternatively, the apertures may be a series of discrete holes or openings arranged along the inner wall 72 rather than a continuous slot.

To further ensure proper mixing within the mixer 50, a vane assembly 80 may be provided in some embodiments. (The vane assembly may be omitted in other embodiments.) The annular ring 60 and the vane assembly 80 may be configured to swirl the air in a same or opposite direction. The vane assembly 80 is disposed in the central duct 52 upstream of the annular ring 60. The vane assembly 80 includes a plurality of vanes 82 circumferentially arranged around a central axis 86 of the central duct 52 and configured to swirl air passing therethrough. The vane assembly 80 includes a hub 84 located on the central axis 86 and the vanes 82 have inboard sides 88 connected to the hub 84. The vane assembly 80 is rotationally fixed within the central duct 52. The vane assembly 80 may be attached within the central duct by connecting the outboard sides 90 of the vanes 82 to an inner wall of the central duct 52. In one example, one or more of the vanes 82 includes a post or shaft (not shown) extending from the outboard side and received within a corresponding feature, e.g., a slot or hole, of the central duct to support the vane assembly 80 therein.

The vanes 82 are pitched to induce a swirl in the high-pressure air charge. The shown vanes 82 are pitched to swirl the air in the same direction as the volute. However, the vanes could be pitched oppositely to induce a counter swirl to the volute in other examples. In this embodiment, the vanes 82 have a fixed pitch, however, as shown below, the vanes may have variable pitch in other embodiments. The vanes 82 may be pitched at a variety of angles depending upon the particular needs of the design. Generally, increasing the pitch (more closed) induces more swirl but also reduces the mass airflow circulating through the mixer. Depending upon the particular needs of the engine, a designer may optimize the pitch to balance swirl and mass airflow. The vane assembly 80 may be located upstream of the annular ring 60 by a distance of 0.25 to 3 times the diameter of the central air duct 52. This distance allows the swirl to be developed with reduced flow loss. In one or more embodiments, the vane assembly may include 3 to 12 vanes, but, of course, this is just one example.

In one or more alternative embodiments, the vane assembly may be variably pitched. The variable-pitch vane assembly may be utilized in conjunction with the annular ring or in an EGR mixer that does not include the annular ring. The variable-pitch vane assembly is disposed in the central air duct upstream of the EGR inlet port(s). The variable-pitch vane assembly includes a plurality of vanes circumferentially arranged around a central axis of the central duct and movable between various pitches to increase and decrease an effective cross-sectional area of the central duct to modify a swirl of the air passing therethrough and to modify the mass airflow through the mixer. The variable-pitch vane assembly may be used in conjunction with a throttle valve or may be used to replace the throttle valve. That is, the pitches of the vanes can be used to throttle the airflow to the engine to allow for the elimination of a standard throttle valve. In some implementations, it may be advantageous to use both a throttle valve and a variable-pitch vane assembly so that the vane assembly can be optimized to control EGR.

Figure 5A:
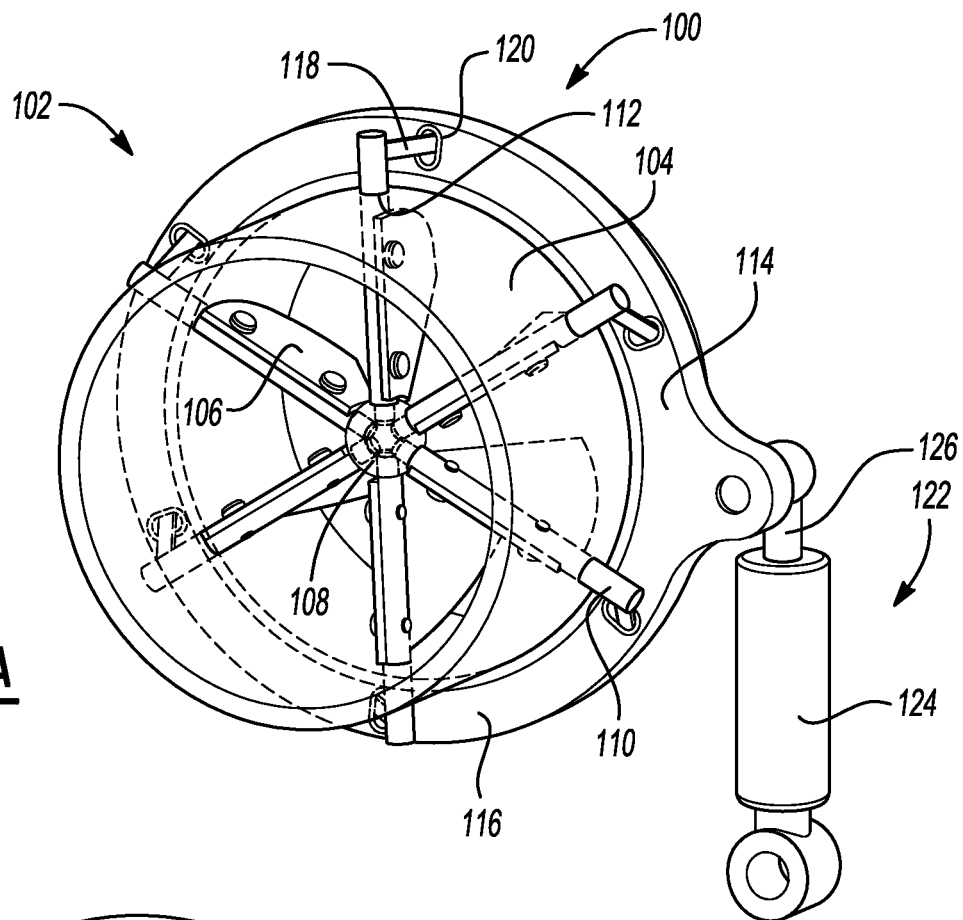
FIGS. 5A and 5B show perspective views of a variable-pitch vane assembly for a high-pressure EGR mixer.
Figure 5B:
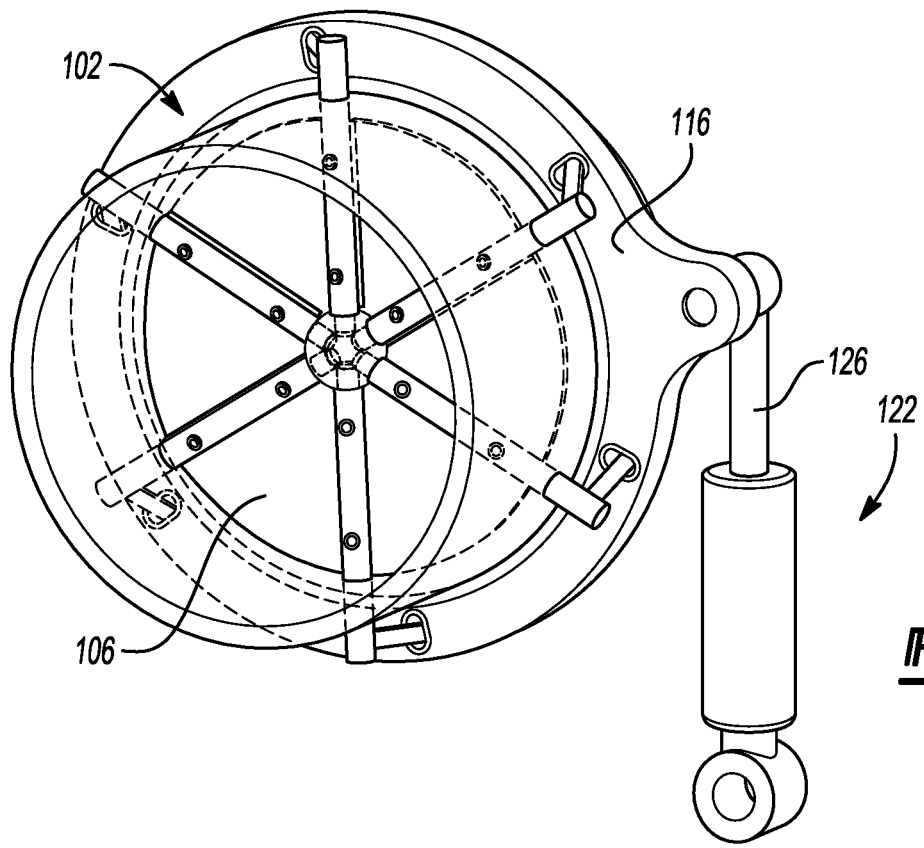

Referring to FIGS. 5A and 5B, another high-pressure EGR mixer 100 includes a variable-pitch vane assembly 102. These figures only show the variable-pitch vane assembly with the understanding that the above-described features, except for the fixed vane assembly, may be used in the EGR mixer. For example, variable-pitch vane assembly 102 may be used in conjunction with the above-described volute. Alternatively, the mixer 100 may not include the volute and instead rely on the variable-pitch vane assembly 102 for providing sufficient mixing of the fresh air charge and the exhaust gases.

The vane assembly 102 may be disposed within a section of the central air duct of the mixer 100 or may be provided as a separate assembly that connects to or is supported within a central air duct. In the example illustration, the section 104 of the central air duct houses the variable-pitch vane assembly 102. An EGR port (not shown) is located downstream of the vane assembly 102 and is either provided in a sidewall of the central air duct or is provided in the volute (if included) as described above.

The vane assembly 102 may include a plurality of vanes 106 circumferentially arranged around a hub 108 that is located on a central axis of the central air duct. The vanes 106 are movable between various pitches to increase and decrease an effective cross-sectional area of the central duct to modify a swirl of the air passing therethrough. For example, each of the vanes 106 may be mounted on a shaft 110 rotatably attached to the central hub 108. Rotation of the shafts 110 changes the pitch of the vanes 106. The shafts 110 may extend through openings 112 defined in the section 104 to connect with an actuator assembly 114.

The actuator assembly 114 is configured to actuate the vanes in a synchronize manner. The actuator assembly 114 may include an actuator ring 116 that circumscribes the vane assembly and is configured to rotate circumferentially relative to the central axis. The shafts 110 are operably coupled to the actuator ring 116 such that circumferential rotation of the ring 116 changes the pitch of the vanes 106. In the illustrated embodiment, the clockwise rotation of the actuator ring 116 opens the vanes 106 and counterclockwise rotation of the actuator ring 116 closes the vanes 106. A stop (not shown and optional) may limit the range of the actuator ring 116 to prevent a negative pitch of the vanes. In an example embodiment, the shafts 110 include associated arms 118 that are received in openings 120 of the ring 116. Rotation of the ring 116 pivots the arms 118 about their shaft 110 causing the vanes 106 to change pitch.

The actuator assembly 114 also includes an actuator 122 that is operably coupled to the actuator ring 116 and is configured to rotate the ring. The actuator 122 may include a linear actuator 124 configured to extend and retract a rod 126 that is connected to the actuator ring 116. As shown in the example figures, extending the rod 126 closes the vanes 106 (FIG. 5B) and retracting the rod 126 opens the vanes 106 (FIG. 5A). The actuator 122 may be electronically controlled by a vehicle controller.

The variable-pitch vanes can be controlled to optimize engine performance based on operating conditions. For example, during an engine condition when EGR in not needed, the variable-vane assembly can be fully opened for minimum pressure loss to improve peak power of the engine. When high EGR is needed, the vanes can be pitched to a large angle (more closed) to restrict air flow and to increase the throttle effect. Here, conventional methods such as the closing of the variable nozzle turbine (VNT) to drive EGR can be avoided. Thus, engine pumping loss can be reduced and BSFC can be improved. In engine conditions requiring medium or low EGR rates, the vane assembly can be pivoted to a smaller angle (more open). Here, EGR mixing and distribution to each cylinder can still meet the requirement for balanced engine performance. The vanes may be adjusted based on air-fuel ratio. Leaner operation of the engine is less sensitive to EGR mixing and the vanes can be opened to reduce the pressure drop. The vane assembly of the mixer and the EGR valve can be optimized to minimize the engine delta while meeting the required intake manifold pressure and EGR rate.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An engine system comprising:
    an engine including an intake manifold;
    a turbocharger including a compressor; and
    an exhaust gas recovery (EGR) mixer coupled between the compressor and the intake manifold, the mixer including:
        a central air duct having a central axis,
        an annular ring circumscribing the central duct and having an inlet connectable to an EGR system and an outlet in fluid communication with the central air duct, and
        a vane assembly disposed in the central air duct upstream of the annular ring and having a plurality of vanes configured to swirl air passing therethrough.

2. The engine system of claim 1, wherein the annular ring and the vane assembly are configured to swirl the air in a same direction.

3. The engine system of claim 1, wherein the vane assembly includes a hub located on the central axis of the central air duct and the vanes have inboard sides connected to the hub.

4. The engine system of claim 3, wherein the vanes have outboard sides connected to an inner wall of the central duct.

5. The engine system of claim 1, wherein the vane assembly is rotationally fixed within the central duct.

6. The engine system of claim 1, wherein the annular ring defines a spiral-shaped volute extending between the inlet and the outlet.

7. The engine system of claim 6, wherein a cross-sectional area of the volute is lager at the inlet than at the outlet.

8. The engine system of claim 1, wherein the vanes are rotatable to change pitch.

9. The engine system of claim 8, wherein the vanes are rotatable between an open position and a closed position in which the vanes block the central duct.

10. The engine system of claim 1, wherein the vane assembly further includes a central hub and the vanes are coupled to the hub such that each vane is rotatable to change pitch.

11. The engine system of claim 10, wherein each of the vanes includes a shaft rotatably attached to the central hub.

12. The engine system of claim 11, wherein the EGR mixer further includes an actuator assembly connected to the shafts and configured to change the pitch of the vanes by rotating the shafts.

13. The engine system of claim 12, wherein the actuator assembly has an actuator ring connected to the shafts and circumferentially rotatable relative to the central axis to change the pitch of the vanes.

14. The engine system of claim 13, wherein the shafts are pivotably attached to the actuator ring.

15. The engine system of claim 13, wherein the actuator assembly further has a linear actuator configured to rotate the actuator ring.

16. The engine system of claim 1 further comprising:
one or more air ducts extending from an outlet of the compressor to an inlet side of the EGR mixer.

17. An engine system comprising:
an engine including an intake manifold;
a turbocharger including a compressor; and
an exhaust gas recovery (EGR) mixer coupled between the compressor and the intake manifold and configured to mix fresh air from the compressor with recovered exhaust gases from an EGR system, the mixer including an air duct defining an EGR port and a variable-pitch vane assembly in fluid communication with the air duct and disposed upstream of the EGR port, wherein the vane assembly includes a plurality of vanes circumferentially arranged around a central axis of the air duct and movable between various pitches to increase and decrease an effective cross-sectional area of the air duct and modify a swirl of the air passing therethrough.

18. The engine system of claim 17, wherein the EGR mixer includes an actuator assembly configured to change the pitch of the vanes.

19. The engine system of claim 18, wherein the actuator assembly includes an actuator ring operably coupled to the vanes and circumferentially rotatable relative to the central axis to change the pitch of the vanes.

20. An exhaust gas recovery (EGR) mixer comprising:
a central duct having an upstream side connectable to a compressor and a downstream side connectable to an engine intake manifold; and
an annular ring circumscribing the central duct and including:
an inlet port connectable to an EGR system,
a volute extending from the inlet port to a terminal end, and
an aperture defined in an inner side wall of the volute to connect the volute and the central duct in fluid communication.

* * * * *